Figure 1:
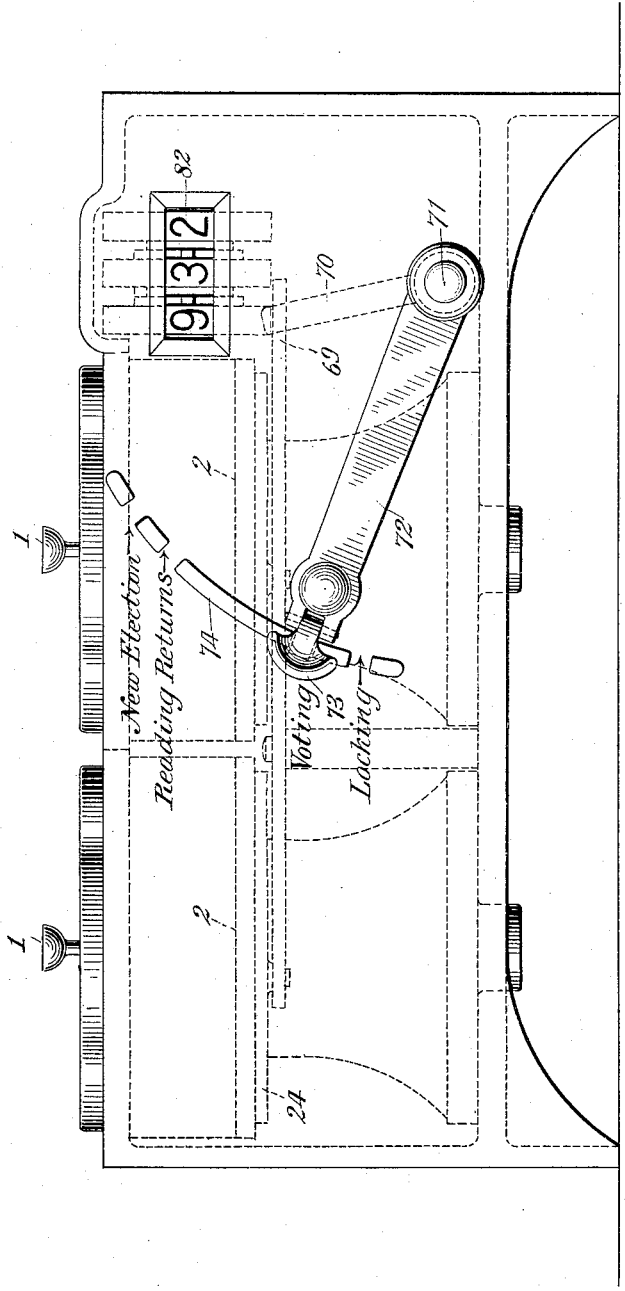

No. 662,694. Patented Nov. 27, 1900.
F. LAMBERT & S. ARONSON.
REGISTERING APPARATUS.
(Application filed Feb. 12, 1898.)

(No Model.) 14 Sheets—Sheet 1.

WITNESSES:
C. E. Ashley
H. W. Lloyd

INVENTORS:
Frank Lambert and Saul Aronson
By their Attorney
Edith J. Griswold

No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 2.

WITNESSES:
C. E. Ashley
H. W. Lloyd

INVENTORS:
Frank Lambert and Saul Aronson
By their Attorney
Edith J. Griswold

No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 3.

WITNESSES:
C. E. Ashley
H. W. Lloyd

INVENTORS:
Frank Lambert and Saul Aronson
By their Attorney
Edith J. Griswold

No. 662,694. Patented Nov. 27, 1900.
F. LAMBERT & S. ARONSON.
REGISTERING APPARATUS.
(Application filed Feb. 12, 1898.)

(No Model.) 14 Sheets—Sheet 4.

WITNESSES:
C. E. Ashley
H. W. Lloyd

INVENTORS:
Frank Lambert and Saul Aronson
By their Attorney
Edith J. Griswold

THE NORRIS PETERS CO., PHOTO-LITHO., WASHINGTON, D. C.

No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 5.
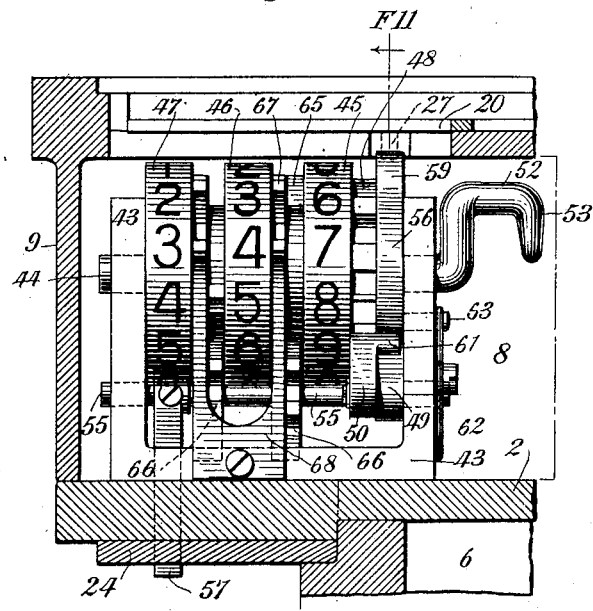
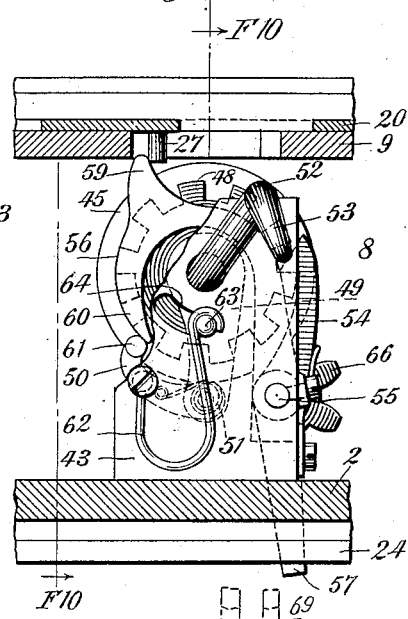
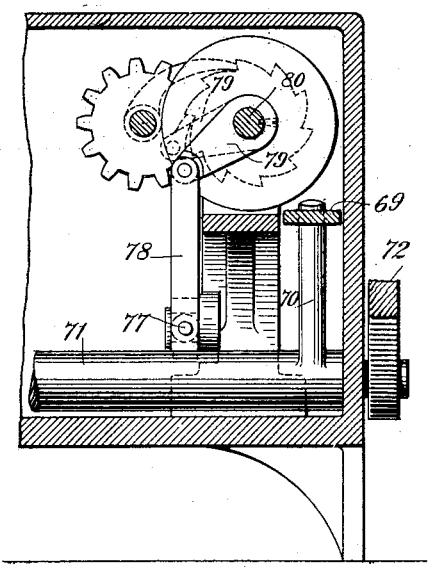
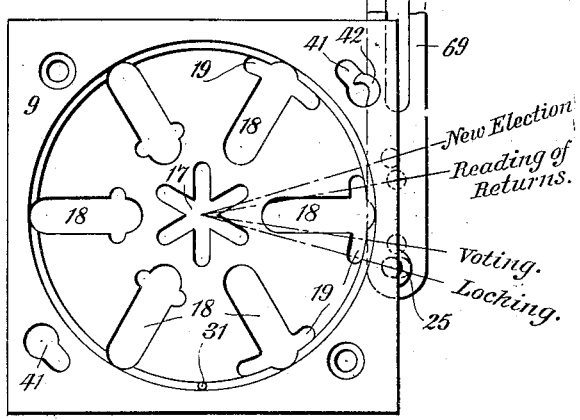
WITNESSES:
C. E. Ashley
H. W. Lloyd
INVENTORS:
Frank Lambert and Saul Aronson
By their Attorney
Edith J. Griswold No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 6.
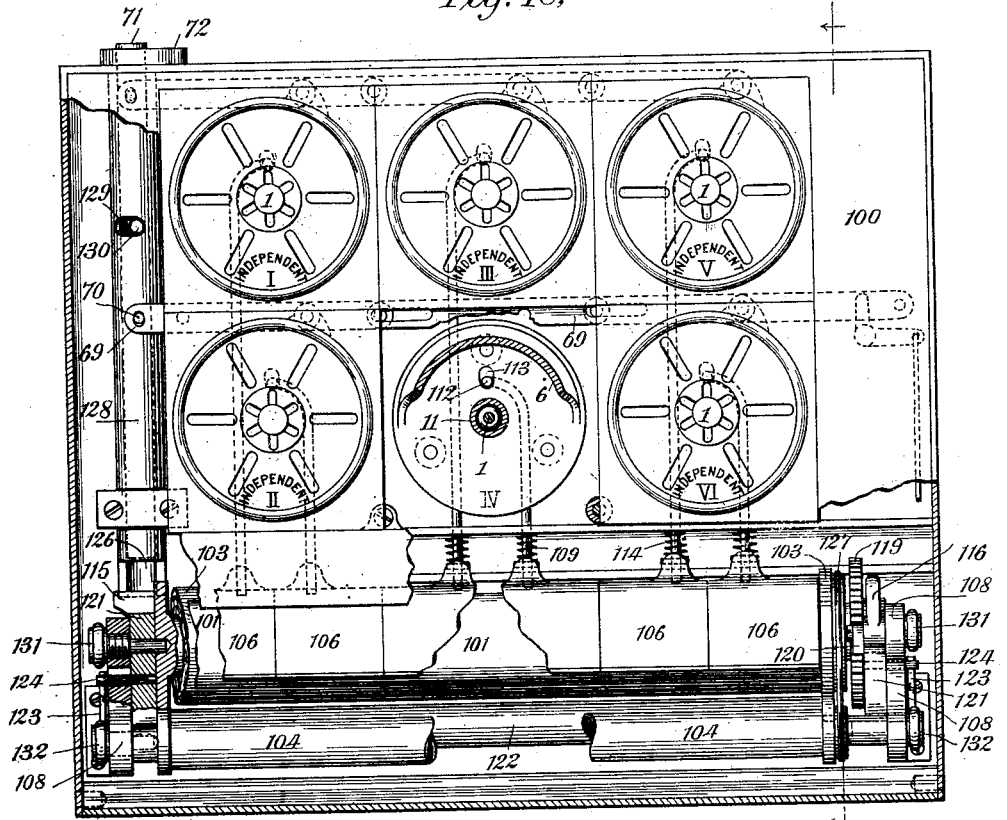
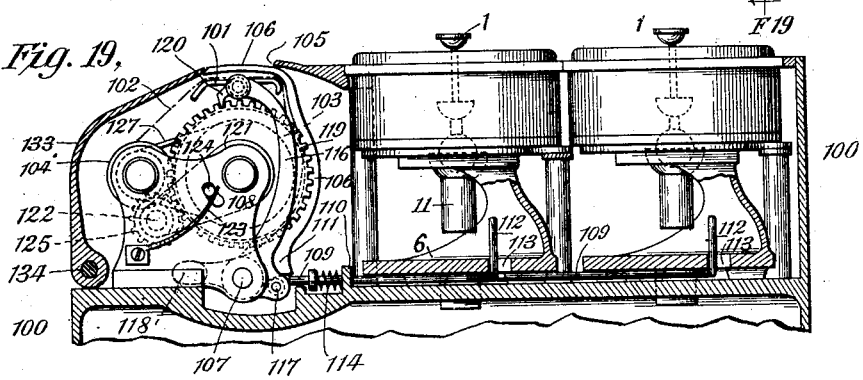
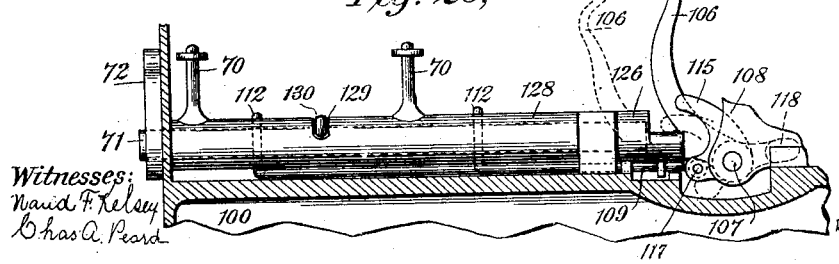
Witnesses:
Inventors:
Frank Lambert
and
Saul Aronson
By their attorney,
Edith J. Griswold
THE NORRIS PETERS CO., PHOTO-LITHO., WASHINGTON, D. C.

No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 7.
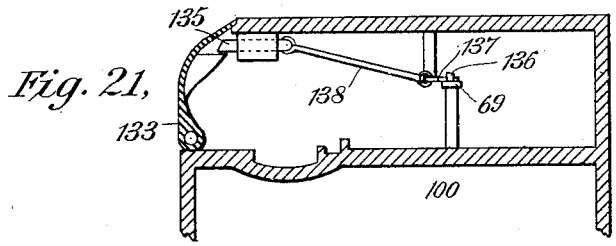
Fig. 21,
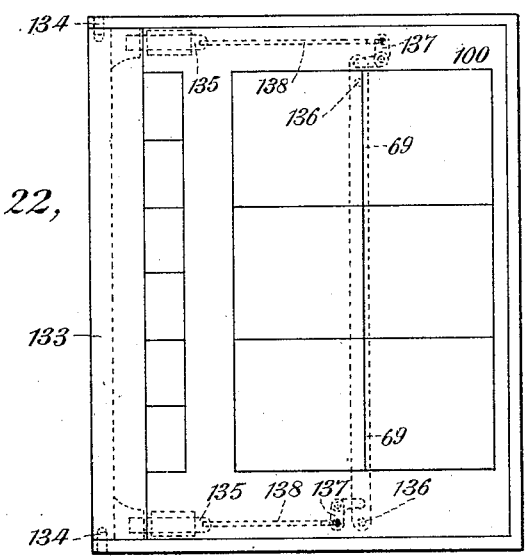
Fig. 22,
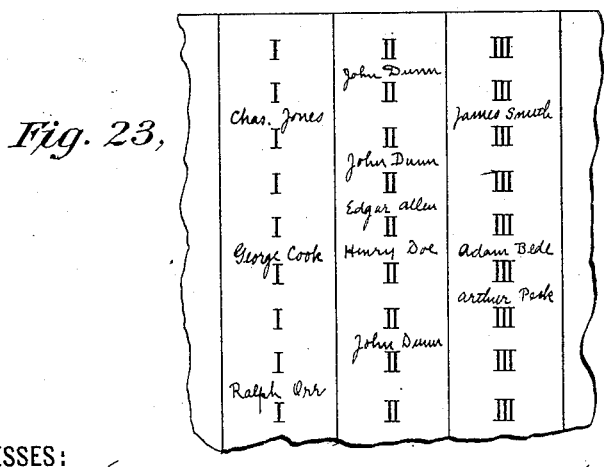
Fig. 23, No. 662,694. Patented Nov. 27, 1900.
F. LAMBERT & S. ARONSON.
REGISTERING APPARATUS.
(Application filed Feb. 12, 1898.)

(No Model.) 14 Sheets—Sheet 8.

WITNESSES:
C. E. Ashley
H. W. Lloyd

INVENTORS:
Frank Lambert and Saul Aronson
By their Attorney
Edith J. Griswold

No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 9.
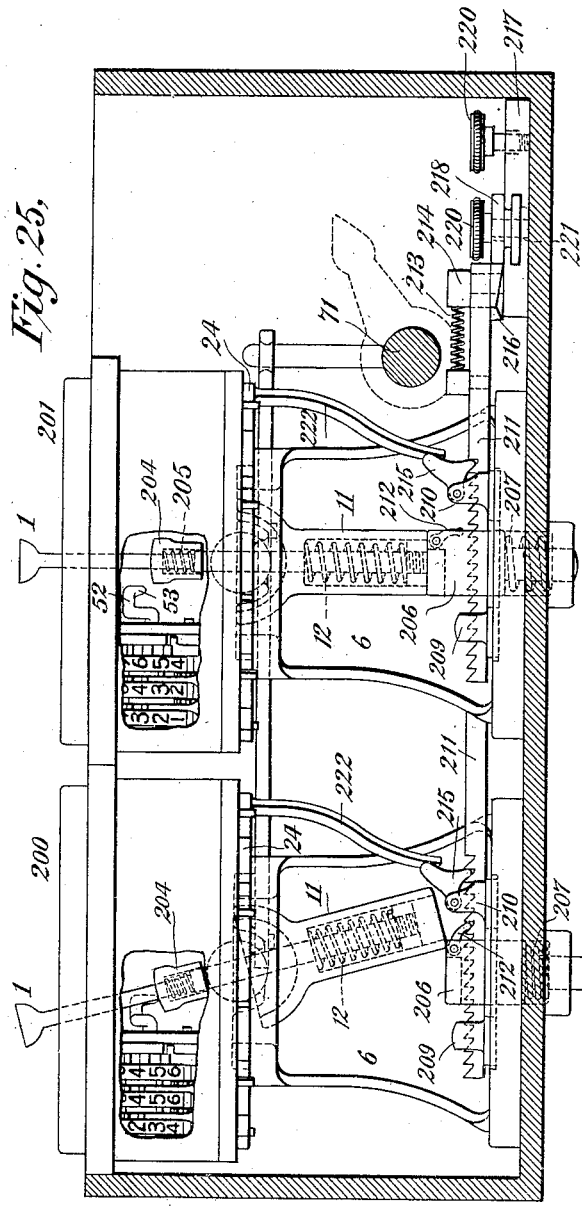
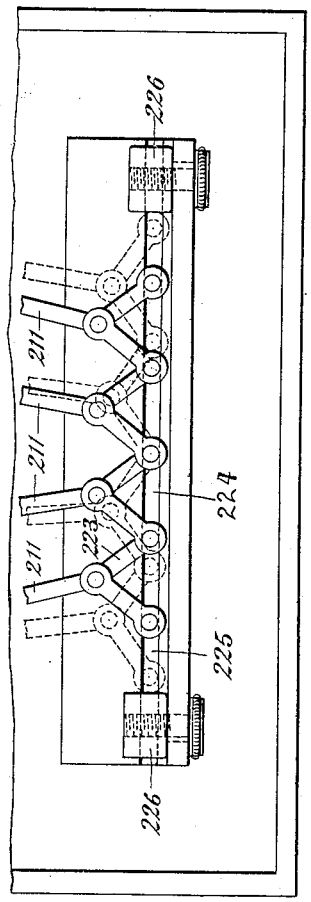
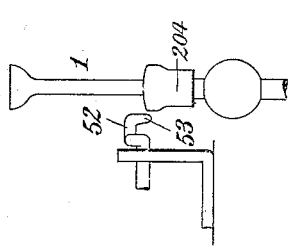
WITNESSES:
INVENTORS:
Frank Lambert and Saul Aronson
By their Attorney No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 10.
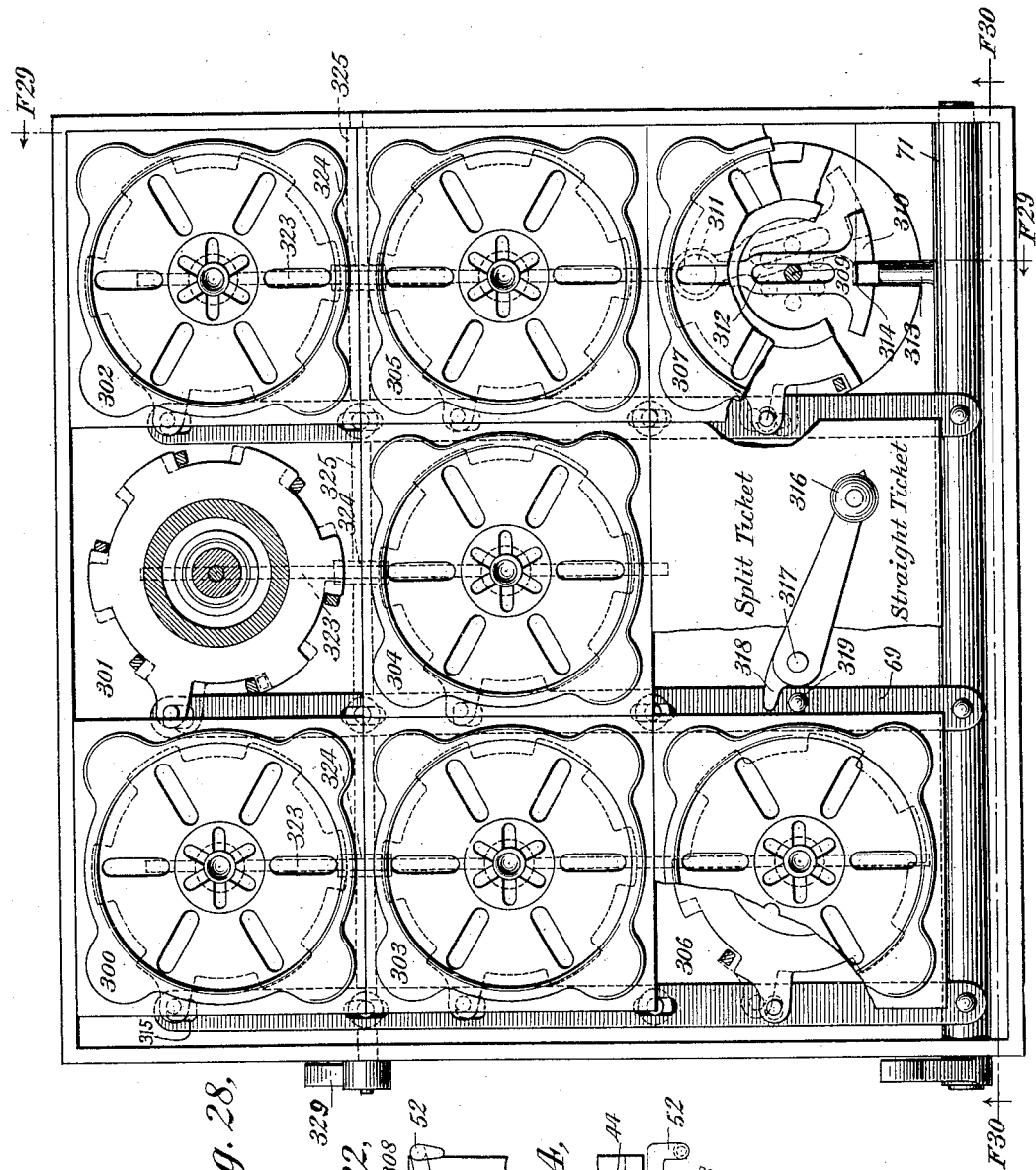
Fig. 28.
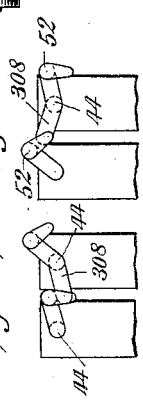
Fig. 31, Fig. 32,
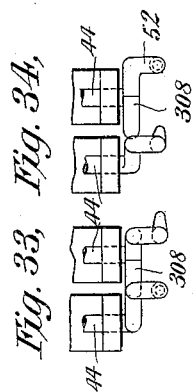
Fig. 33, Fig. 34,
WITNESSES:
C. E. Ashley
H. W. Lloyd
INVENTORS:
Frank Lambert and Saul Aronson
By their Attorney
Edith J. Griswold No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 11.
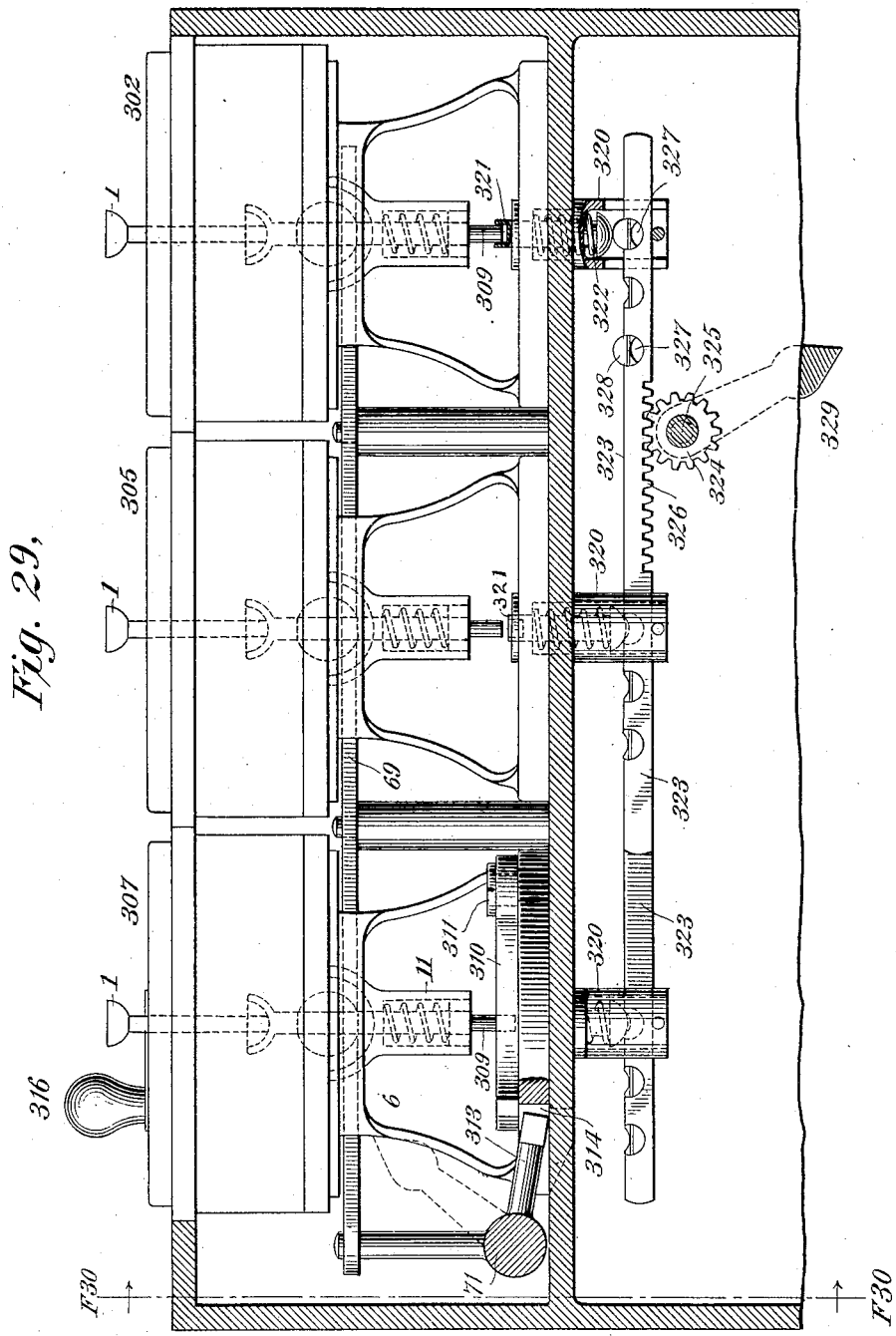

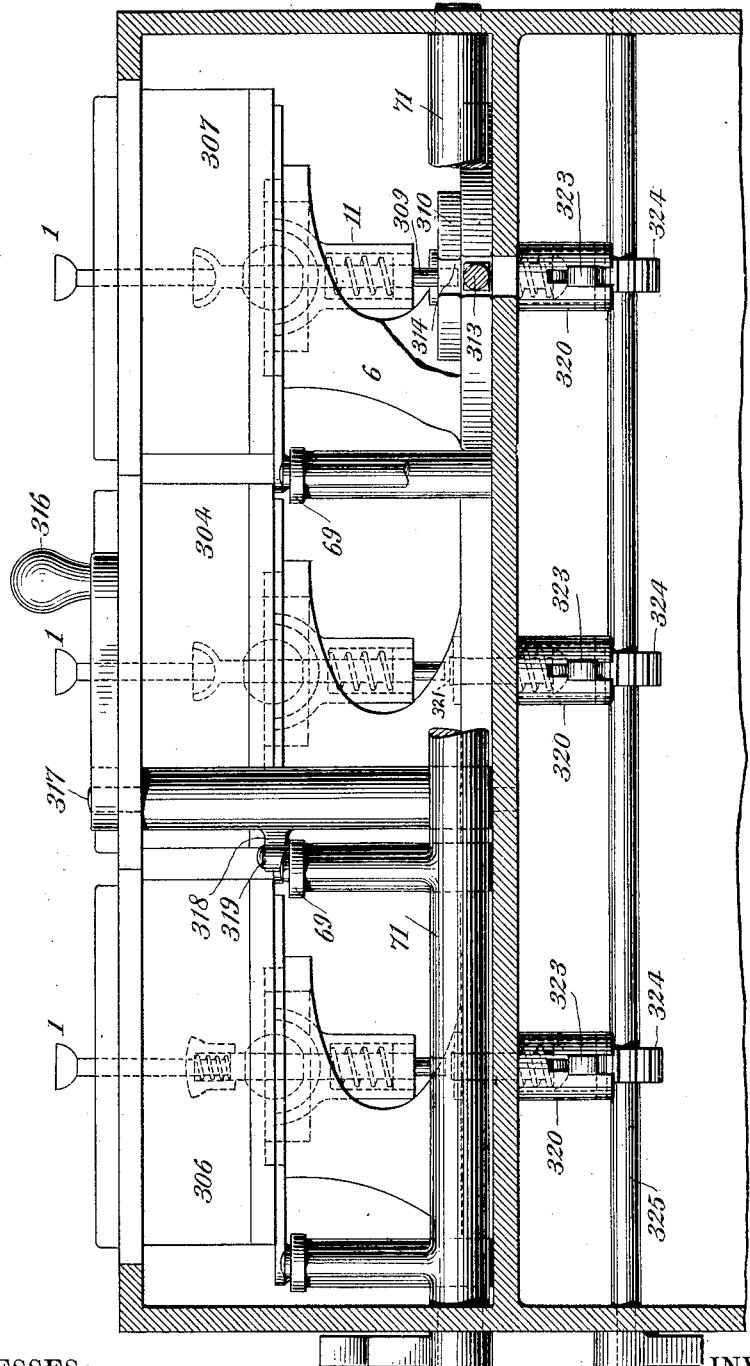

No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 13.
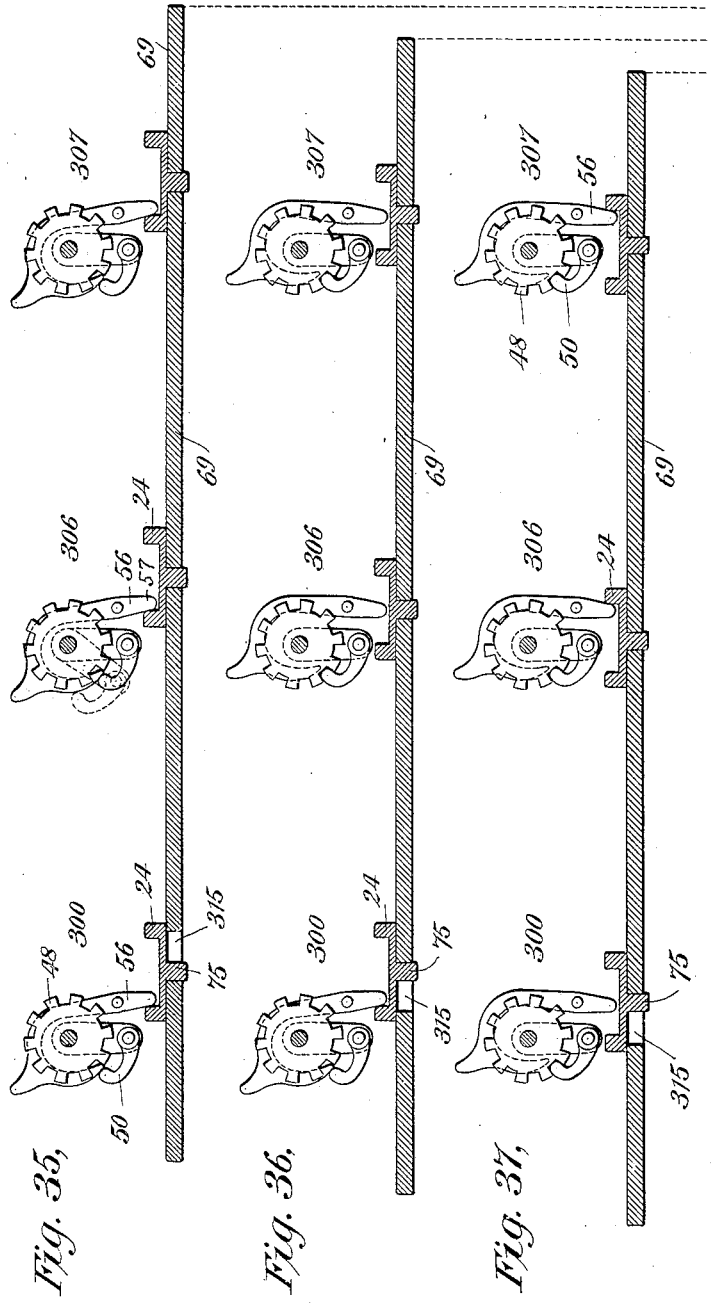
WITNESSES:
C. E. Ashley
H. W. Lloyd.
INVENTORS:
Frank Lambert and Saul Aronson
By their Attorney
Edith J. Griswold No. 662,694. Patented Nov. 27, 1900.
F. LAMBERT & S. ARONSON.
REGISTERING APPARATUS.
(Application filed Feb. 12, 1898.)
(No Model.) 14 Sheets—Sheet 14.
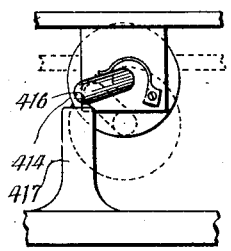
Fig. 40.
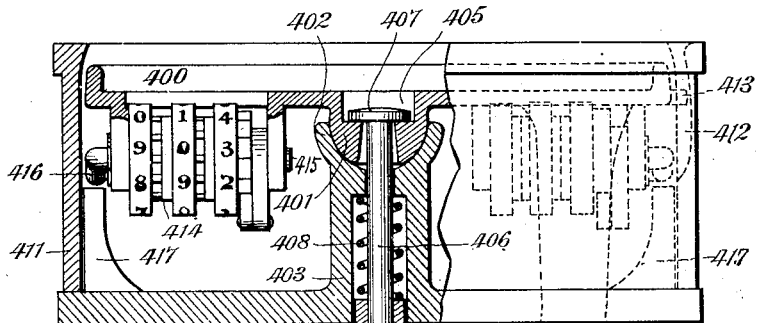
Fig. 38.
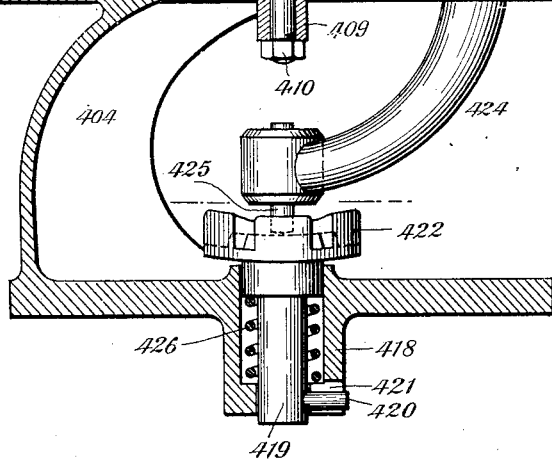
Fig. 39.
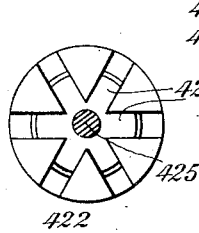
Fig. 41.
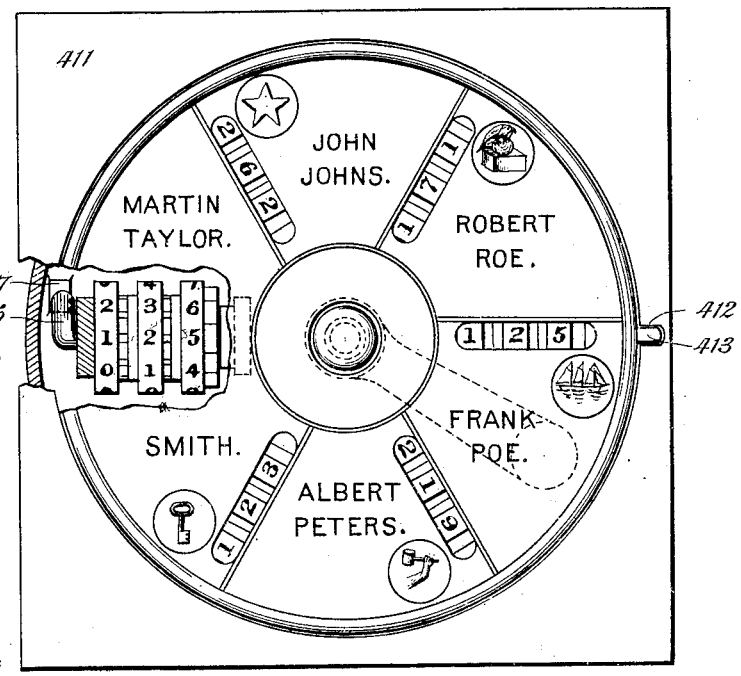
Witnesses: Maud F. Kelsey, Chas. A. Pearl
Inventors: Frank Lambert and Saul Aronson
By their attorney Edith J. Griswold

UNITED STATES PATENT OFFICE.

FRANK LAMBERT AND SAUL ARONSON, OF NEW YORK, N. Y.

REGISTERING APPARATUS.

SPECIFICATION forming part of Letters Patent No. 662,694, dated November 27, 1900.

Application filed February 12, 1898. Serial No. 670,066. (No model.)

*To all whom it may concern:*

Be it known that we, FRANK LAMBERT and SAUL ARONSON, citizens of the United States, residing at New York, (Brooklyn,) Kings county, State of New York, have invented certain new and useful Improvements in Registering Apparatus, of which the following is a specification.

This invention relates to indicating, registering, or recording apparatus in general, though more particularly described in relation to voting-machines.

The principal feature of the invention is a nutating key—that is, a key free to be tilted in various directions to operate one or more registering or recording mechanisms.

Figure 2:
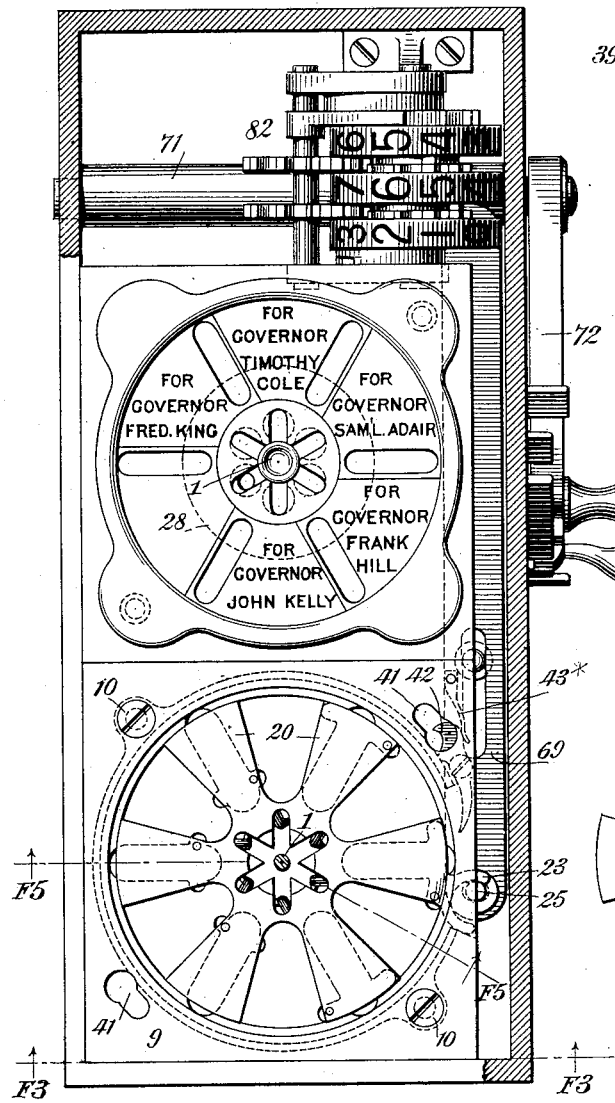
Figure 14:
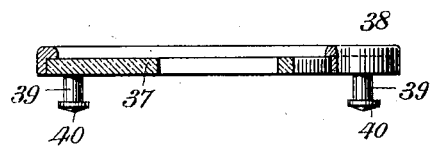
Figure 3:
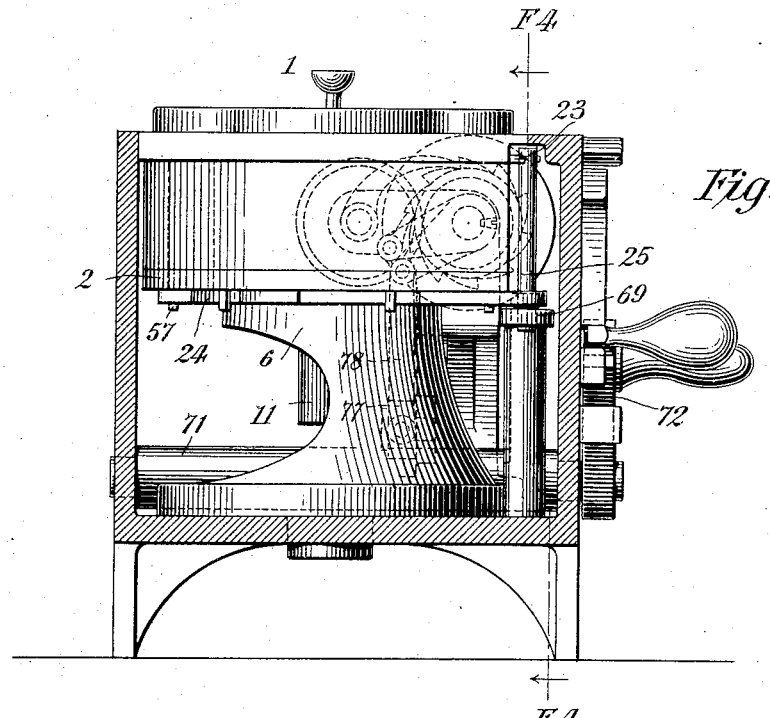
Figure 4:
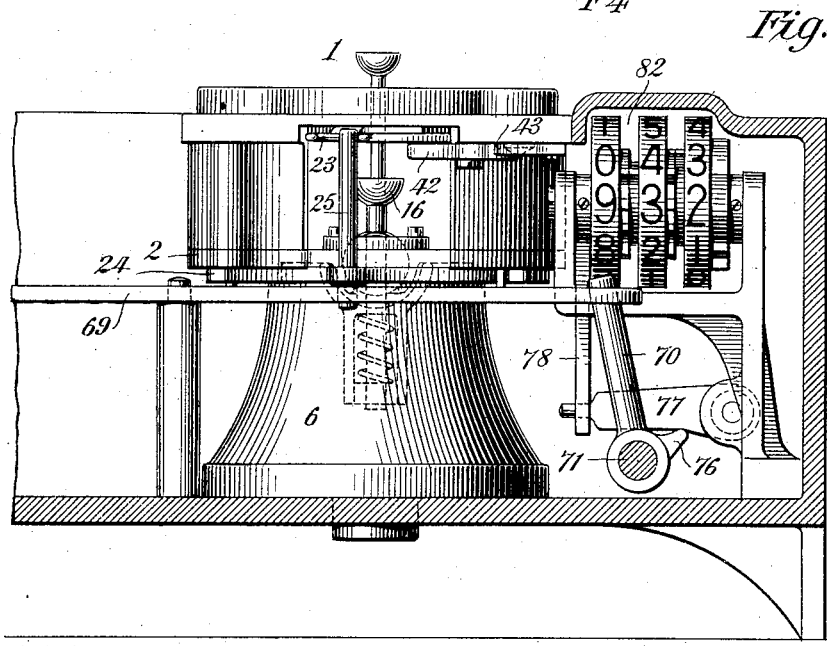
Figure 5:
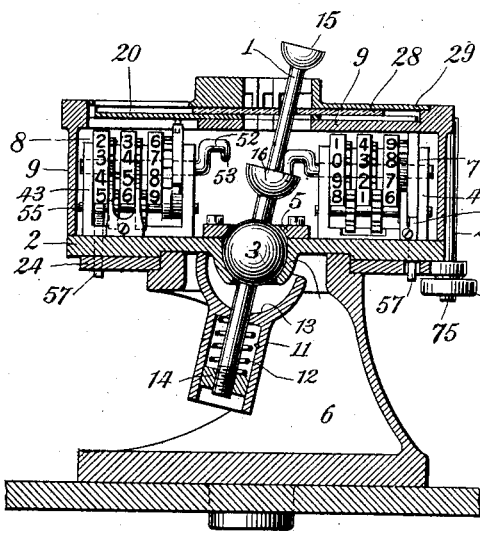
Figure 7:
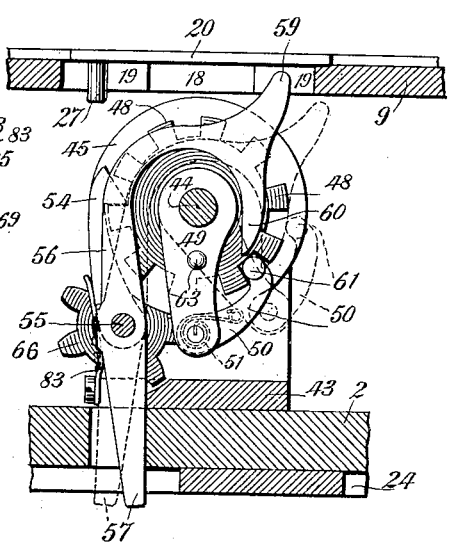
Figure 6:
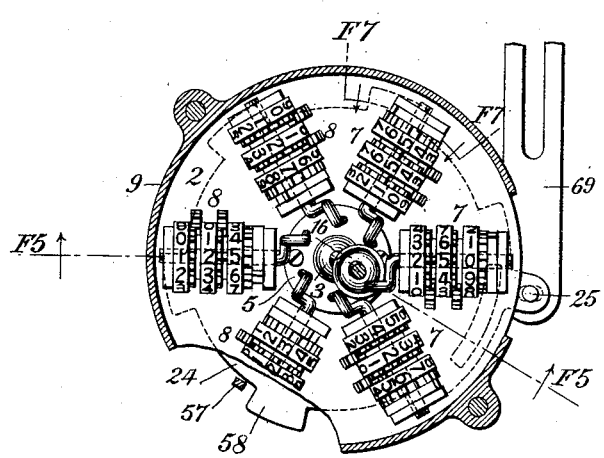
Figure 8:
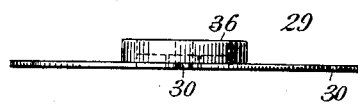
Figure 9:
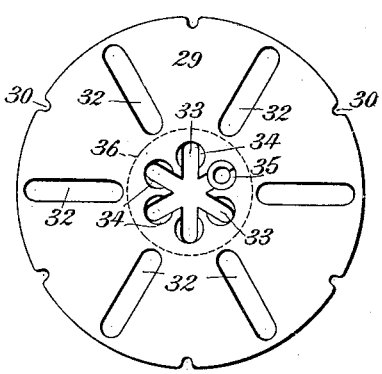
Figure 24:
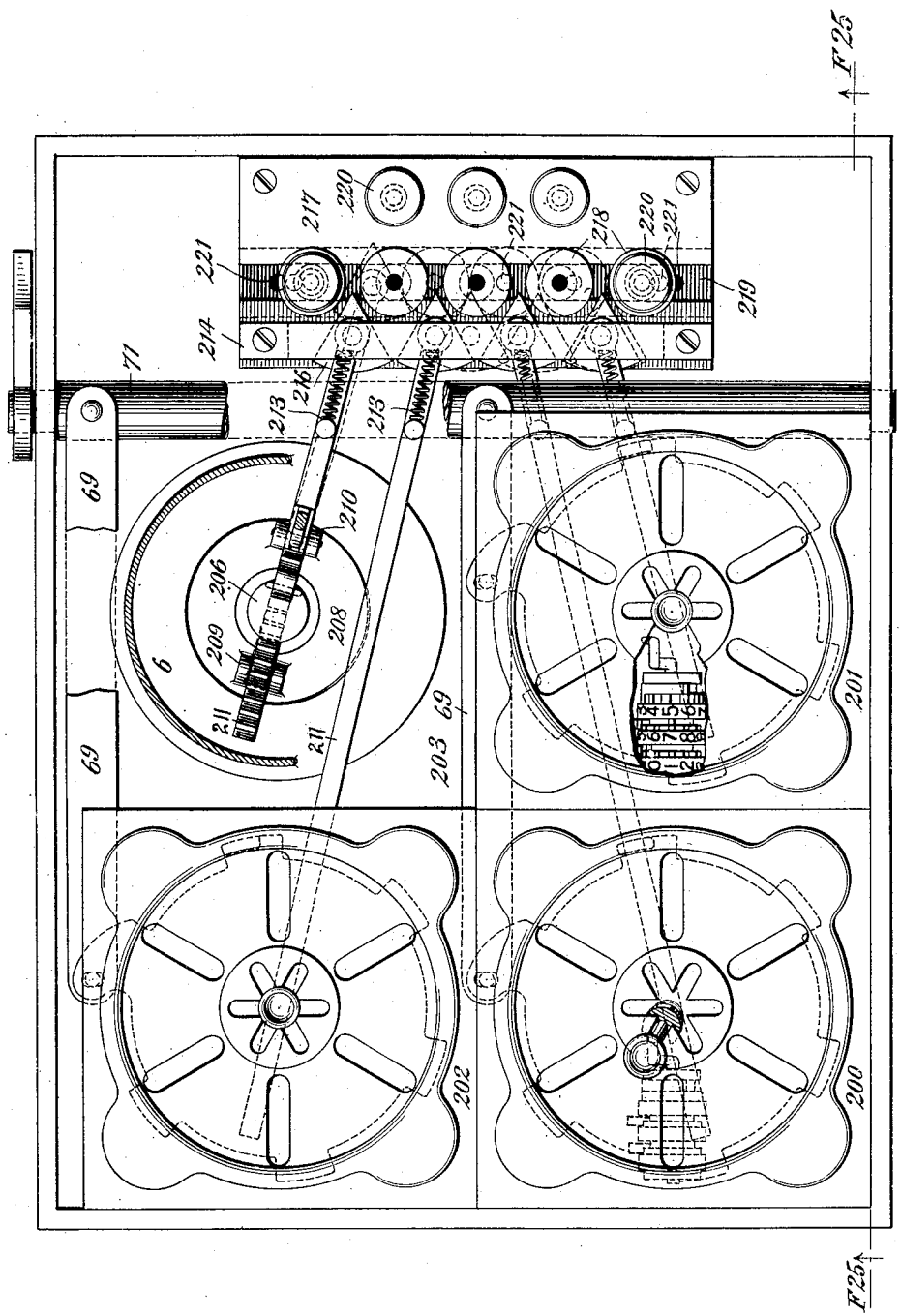

In the accompanying drawings, Figure 1 is an outside elevation of a registering-machine adapted to be used for voting. Fig. 2 is a plan, partly in section, of the same machine. Fig. 3 is a sectional elevation taken on line $F^3 F^3$ of Fig. 2. Fig. 4 is a sectional elevation through line $F^4 F^4$ of Fig. 3. Fig. 5 is a section taken on line $F^5 F^5$ of Figs. 2 and 6. Fig. 6 is a sectional plan of one of the cells. Fig. 7 is a view of a detail, drawn to an enlarged scale, taken on line $F^7 F^7$ of Fig. 6. Figs. 8 and 9 are edge and inverted plan views, respectively, of a detail. Fig. 10 is a portion of an enlarged sectional elevation similar to Fig. 5, showing in full side view one of the registering mechanisms and taken on line $F^{10} F^{10}$ of Fig. 11. Fig. 11 is a view taken on line $F^{11} F^{11}$ of Fig. 10. Figs. 12 to 17, inclusive, are views of details hereinafter referred to. Fig. 18 is a plan view of a machine adapted to register independent votes as well as votes for regular candidates. Fig. 19 is a side elevation taken on line $F^{19} F^{19}$ of Fig. 18. Fig. 20 is a partial side elevation looking at Fig. 18 from the left-hand side, the casing being in section. Figs. 21, 22, and 23 show details relating to Fig. 18 and hereinafter referred to. Fig. 24 is a plan view of a voting-machine adapted for group voting. Fig. 25 is a sectional elevation taken on line $F^{25} F^{25}$ of Fig. 24. Fig. 26 is a detail view. Fig. 27 represents a modification of a portion of Fig. 24. Fig. 28 is a plan view of a voting-machine in which one of the cells is adapted to register "straight-ticket" votes and another cell adapted for amendment-votes. Fig. 29 is a sectional elevation taken on line $F^{29} F^{29}$ of Fig. 28. Fig. 30 is a sectional elevation taken on line $F^{30} F^{30}$ of Figs. 28 and 29, certain portions being broken away. Figs. 31 to 34 are details hereinafter referred to. Figs. 35, 36, and 37 are diagrams representing the various positions of some of the working parts. Fig. 38 is a side elevation, partly in section, of a modified form of the single cell working on the principle of a nutating key. Fig. 39 is a plan view of Fig. 38 with a portion broken away. Figs. 40 and 41 are details hereinafter referred to.

All of the variations necessary in a general voting-machine are represented in the drawings and hereinafter described. All the cells shown and described are operated on the same general principle—that is, a nutating multiple key is adapted to operate a plurality of indicating or registering mechanisms.

Figs. 1 to 17 represent the details of mechanism for one form of voting, in which two cells are shown to illustrate how a plurality of cells can be controlled from outside of the booth. Each cell is adapted to separately indicate or register the votes cast for a certain number of candidates for a single office by means of a nutating multiple key, and as many cells are necessary as there are officers to be elected at one time.

Normally the registers are completely covered, so that the voter cannot tell how the registers stand. When a key has been once used for voting, it is locked, so that only one vote can be cast in each cell, and before another voter is admitted to the voting-booth the key is released and a totalizing-register actuated to show the total number of voters, all as hereinafter explained.

Each cell will be first described apart from the rest of the mechanisms shown in Figs. 1 to 4.

Referring to Figs. 3, 4, and 5, key-lever 1 is so mounted in register-plate 2 as to be free to be tilted in any direction. As shown, the spherical part or ball 3 of the key is fulcrumed in the socket-bearing 4 of plate 2, the lower end of the key extending through an opening in the lower part of the bearing 4, and a cap 5 is secured to plate 2 to prevent the lifting of the key. The register-plate 2 is rigidly supported on standard 6 and has secured to its upper side a number of registers 7 8. A hood 9, secured to the register-plate by screws 10, Fig. 2, surrounds and covers the registers.

The key 1 is normally held in a vertical position, as shown in Figs. 1, 2, 3, and 4, by means of a rider 11 and a spring 12. The lower face of the plate 2 immediately around the bearing 4, Fig. 5, is approximately on a level with the center of the ball 3. The rider 11 is cupped or shaped at its upper part to straddle the bearing 4 and at the lower part forms a sleeve fitted at the part 13 to slide on the lower end of the key 1. The recess in the sleeve below the part 13 receives the spring 12, which is held therein by a nut 14, screwed on the lower end of the key. This nut forces the spring 12 and rider 11 upward, and consequently the upper edge or bearing-face of the rider is brought to bear squarely against the lower face of the plate 2, as shown in dotted lines in Fig. 4.

If the key 1 is tilted, as shown in Fig. 5, the straddling part of the rider 11 cannot maintain its normal position relative to the ball 3, as the plate 2 prevents this. Consequently the rider 11 will slide downward on the lower end of the key and on nut 14, compressing the spring 12 between the shoulder at 13 and said nut, and when the key is released the compressed spring 12 forces the key and rider back to their normal positions. The key 1 is further provided with a knob 15, which may be hollowed out at the top to receive a finger of the operator, and between the ball 3 and the knob 15 the key is provided with a cup 16, the purpose of which is hereinafter explained. To prevent any undue strain on the key, it is so mounted in its ball-and-socket joint as to be free to rotate on its own axis.

The tilting of the key 1 in certain directions actuates the registers 7 8, as will be explained, and to enable this to be done properly the tilting of the key must be limited to certain definite directions. For this purpose the top of the hood 9 is provided with radial slots 17, Fig. 13, in which slots the key is normally free to move, the number of slots corresponding to the number of registers 7 8—that is, six in the machine represented.

The registers 7 8 are preferably placed radially from the center of movement of the key and equidistant from each other. The slots 17 will also be preferably equidistant from each other and on radii somewhat to one side of the axes of the registers, in this case thirty degrees or midway between two of the said axes.

The hood 9, which is shown separately in Fig. 13, is further provided with slots or openings 18 just above the register and wide enough to disclose the top row of numbers on the register-wheels. Slots 19 are circumferentially extended, for the purpose explained farther on. The top of the hood 9 has concentric recesses, in the lower one of which spider 20 is freely mounted, as shown in Figs. 2, 5, 7, 10, and 11 and separately in Figs. 16 and 17. The purpose of this spider is to normally cover the registers, to block the key when the registers are uncovered, and to act on the registers to allow them to be returned to zero for a new election. The spider is star-shaped or formed with alternate solid portions 21 and openings 22, whereby it may serve alternately to cover and uncover the registers 7 8. A forked projection 23 of the spider extends through one of the openings 18 and slots 19 in the hood 9 and can be moved back and forth within the cut-away portion of the hood. (See Fig. 4.)

A ring 24, just below the plate 2, Figs. 3, 4, 5, and 6, is guided and supported on a circular shoulder of the standard 6 and is capable of partial rotation. A rod 25, projecting upward from this ring, engages between the forks of the projection 23 to move the spider 20. Normally the solid portions 21 of spider 20 cover the openings 18 in the hood 9, and therefore also cover the registers 7 8. The spider 20 is also provided with radial slots 26, normally corresponding in position to slots 17 in hood 9; but when the spider 20 is partially rotated the solid portion between the slots 26 cover part of the slots 17, and thus reduce the angle of tilting of the key 1. Pins 27, secured to the spider 20, project downward therefrom, for a purpose hereinafter explained.

Figure 15:
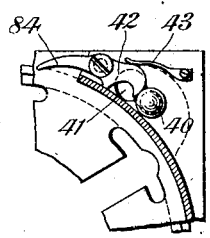
Figure 16:
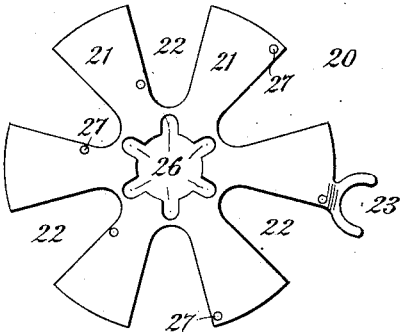
Figure 17:
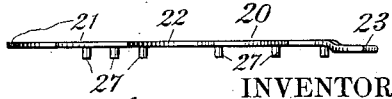

Just above the spider 20 is a follower 28 in disk form, preferably of transparent material, as glass, Figs. 2 and 5, which follower is loosely mounted on the key 1 and is carried along with the key in all of its movements. This follower completely covers the slotted central opening of the cell at all times and prevents any tampering with the registering or other mechanism. Above the follower 28, resting in another circular recess of the hood 9, is a "paper-plate" 29, Figs. 5, 8, and 9, located in proper relative position by means of notches 30, Fig. 9, and pins 31, Fig. 13. Fig. 9 is a bottom plan view of the paper-plate 29, and Fig. 8 an edge view thereof. The plate 29 is provided with openings 32, corresponding to openings 18 in hood 9, and also with slots 33, corresponding to slots 17, Fig. 13. On the under side of the plate circular recesses 34 are countersunk across the slots 33 and in the path of the key 1, and into the said circular recesses small spring-rings 35 may be forced to prevent and limit the extent of the tilting of the key in the corresponding slots, whereby the corresponding register cannot be actuated in case it is desired to prevent the operation of one or more certain registers. This plate 29 is called the "paper-plate" as it supports a label bearing the names of the candidates or other denominations for the registers. The label is shown in one of the cells in Fig. 2. Slots corresponding to slots 32 and a central opening to allow the disk to be slipped over the raised portion 36 of plate 29 are cut through the label. Above the label is placed a circular plate or cover of glass 37, Fig. 14, having a central opening to receive the raised center 36, the said glass being held in position and the mechanism above the hood protected from unauthorized interference by the frame 38, locked to the hood in the following manner: This frame 38 is provided with pins 39, having beveled heads 40, adapted to pass through the enlarged portion of slots 41 in the square top flange of the hood 9. (See Figs. 2 and 15.) Fig. 15 is an inverted plan of a portion of the top flange of hood 9. A locking-pawl 42 is pivoted to the under side of this top flange, and normally the spring 43* presses the pawl 42 beneath the enlarged portion of one of the slots 41. When the pins 39 enter the slots 41, the beveled head 40, above the pawl 42, pushes the pawl out of its way, and when the frame 38 is then partially rotated to bring the pins 39 in the narrow portion of the slots 41, and hence prevent the frame from lifting, the locking-pawl 42, returning to its normal position, prevents the rotation of the frame, and thereby locks it.

*Registers.*—Referring now to Figs. 5, 6, 7, 10, and 11, the bracket 43 of each register 7 or 8 carries a shaft 44, having a series of register-wheels, as 45 46 47, loosely mounted thereon. The units-wheel 45 has secured thereto a ratchet-wheel 48, having ten preferably square-cut notches. In front of the ratchet 48 an arm 49, Fig. 7, rigidly secured to register-shaft 44, carries a driving-pawl 50, having a squared end to engage in the notches of the ratchet. The square notches and pawl prevent tripping in either direction when a pawl and a ratchet are in engagement, and therefore normally prevent the register from being operated by any other means.

The inner ends of the register-shafts 44 are formed in shape of cranks 52 and have hooked extensions 53. Normally the register-shafts 44 are in such position that the cranks 52 lie in the various paths defined for the key 1 by the slots 17, as shown in Fig. 2. When, therefore, the key is tilted and advances through one of the slots 17, it strikes the rounded or beveled end of the crank 52 and swings it downward out of the way of the advancing key, and thus turns the register-shaft 44 one-tenth of a revolution or a little over. The arm 49 being secured to the register-shaft 44, turns with it and by means of the driving-pawl 50, mounted on said arm, advances the ratchet 48 one-tenth of a turn, and consequently the units-register wheel 45 one unit. A spring-actuated retaining-pawl 54, mounted on an auxiliary shaft 55, engages the ratchet 48, allowing it to advance, but preventing its return. The driving-pawl 50 being retained in the notch in the ratchet 48, by engaging which it advances said ratchet, the crank 52 is maintained in its downward position. Hence when the key 1 swings the crank 52 downward the hook 53, entering the cup 16, retains the key in its tilted position, as shown in Figs. 5 and 6, against the action of spring 12. It will thus be seen that a voter can cast but one vote in a cell—that is, a vote for one candidate for each office. To prepare the cell for the next voter, the key must be unlocked and the register-shaft 44 and its arm 49 returned to their normal positions.

All the registers in the cell are constructed with the same parts; but the units-wheel 45, the ratchet 48, and arm 49 of the registers 7 are placed on the outer end of register-shaft 44 and of the registers 8 on the inner end in order that the registers may be read correctly by the inspectors from one side of the complete cell.

A lever 56 in each register, fast on the auxiliary shaft 55, is placed at the side of the ratchet 48 and is so shaped as to pass over and around the arm 49. Fig. 7 shows one of the registers 7 from the outer end, and Fig. 11 shows one of the registers 8 from the inner end. The operation is the same in each, however, and all the levers 56 stand in the same direction relative to the center of the cell, so that the levers 56, by means of the lever-tails 57, which pass down through openings in plate 2, are actuated alike and together by ring 24. The ring 24 is provided with projections 58 to engage the lever-tails 57. (See Fig. 6.) The levers 56 on the registers 8 being near the center of the cell, the tails 57 on those levers are placed near the outer end of auxiliary shaft 55, as shown in Fig. 10. The upper extensions 59 of levers 56 work in slots 19, for a purpose hereinafter explained.

The curved portion 60 of the lever 56 moves in a path to engage a projection 61 on the driving-pawl 50, and when the lever 56 is moved into the position shown in dotted lines in Fig. 7 the pawl 50 is forced out of the ratchet 48 against the action of spring 51, and register-shaft 44 and arm 49 are free to return to their normal positions. A spring 62, Fig. 11, secured at one end to the bracket 43, bears on a pin 63, projecting from the arm 49 through the slot 64 in the bracket. As soon as the curved portion 60 clears the pawl 50 from the ratchet 48 the spring 62 forces the arm 49 and register-shaft 44 back to their normal positions, the pawl 50 being out of engagement with ratchet 48, as shown in Fig. 11. The dotted position of arm 49 and pawl 50 in Fig. 7 can of course be only momentary. As register-shaft 44 resumes its normal position the hook 53 is raised out of the cup 16 and the key 1 is returned to its normal upright position by means of the rider 11 and spring 12. As long as the lever 56 is in the position shown in Fig. 11 the tilting of the key 1 will have no effect on the register, as driving-pawl 50 would ride on the outer edge of the curved portion 60 and not engage in ratchet 48.

At each revolution of units-wheel 45 a pin 65 thereon, Fig. 10, moves the star-wheel 66 (loosely mounted on auxiliary shaft 55) one tooth, and star-wheel 66 in turn actuates a pinion 67 on the tens-wheel 46. The hundreds-wheel 47 and any other register-wheels that may be used are operated in the same way by the preceding register-wheels. Springs 68 prevent the pinions 67 from slipping when not positively moved.

A slide 69, Figs. 1 to 6 and 12 and 13, adapted to control all the cells, is actuated by a finger 70, carried on the controlling-shaft 71, Figs. 1 and 4. The controlling-shaft 71 is turned by means of the operating and indicating lever 72, Figs. 1, 2, and 3, from outside the booth. Lever 72 has a pivoted latch 73, which enters slots in the indicator 74 to lock the lever 72 in its respective positions.

The slide 69 (or, if more than one row of cells is used, slides 69, all actuated by fingers 70 on controlling-shaft 71) is engaged with the rings 24 by means of pins 75, projecting downward from the rings 24. (See Fig. 5.)

Operation.

*Voting position.*—When the indicating-lever 72 is in the position shown in Fig. 1, or the voting position, slide 69 is in the position shown in Fig. 2, or "voting" position, Fig. 13. The registers 7 8 are covered by spider 20, the registering mechanism is in the position shown in full lines in Fig. 7, the hooks 53 and cranks 52 are in the raised position, and key 1 is free to be tilted in the central radial slots 17. The voter tilts the key 1 through one of the slots toward the name of the candidate he wishes to vote for. The key striking the register-crank 52 turns it downward and, as before described, one unit is registered for that candidate. The key 1 is locked in the tilted position by the hook 53 engaging in cup 16, the crank 52 being held from return motion by pawl 50, as hereinbefore explained.

*Locked position.*—When the voter leaves the booth, the indicating-lever 72, Fig. 1, is moved to the lowest position in the indicator 74, which moves the slide 69 into "locking" position. (Shown in full lines in Fig. 13.) The ring 24 is thus moved a partial rotation, sufficient to act upon the lever-tails 57 (see Fig. 6) and move all the levers 56 into the position shown in full lines in Fig. 11 and in dotted lines in Fig. 7. All the driving-pawls 50 are thus disengaged from their respective ratchets 48 and the arm 49 and register-shaft 44 of any register which has been actuated return to normal position, thus releasing the key 1. The spider 20 has not been moved, as the forks of projection 23 are sufficiently far apart to permit of this slight movement of the ring 24 and its rod 25 without affecting the spider. This is called the "locked" position, as the registering-wheels cannot be actuated by any movement of the key 1 or register-shaft 44, as hereinbefore explained.

*Totalizing-register.*—As the indicating-lever 72 is moved from voting to locking position a spur 76 on controlling-shaft 71, Fig. 4, raises an arm 77, pivoted to the framework. This arm 77 in turn lifts link 78 and arm 79, secured to shaft 80. Secured to the units-wheel end of shaft 80 is a pawl-carrier 81, the pawl engaging in a ratchet on the units-wheel. (See dotted lines, Fig. 12.) Any suitable form of register 82 may be used which can be adapted to register through the mechanism 76, 77, and 78. Thus each time the lever 72 is moved to release the keys the totalizing-register 82 is advanced a unit to show the total number of voters. When another voter enters the booth, the indicating-lever 72 is shifted back to voting position, whereby the ring 24 releases the levers 56, which return to normal position under the influence of springs 83, Fig. 7, and driving-pawls 50 engage with ratchets 48.

*Reading returns.*—When the votes have all been cast, operating-lever 72 is first moved into locking position, whereby the keys are reset in normal position, and then lever 72 is moved to "reading-of-returns" position, Fig. 1, thereby causing the slide 69 to move the rings 24. The rod 25 is moved into the position reading of returns, Fig. 13, and being engaged with the fork 23 rotates the spider 20 sufficiently to uncover the registers 7 8 and allow of the election returns being read. If every voter has operated a cell, the total number of votes registered in that cell should correspond with the number showing on totalizing-register 82. When the lever 72 is set to reading-of-returns position, the solid portions of the spider 20 between the slots 26 come in line with and partly cover the radial slots 17, thus reducing the angle of tilting of the key 1 to prevent further operation of the registers by means of the key.

*New election.*—To change the label and return the registers 7 8 to zero, the lever 72 is moved to "New-election" position, thereby moving rod 25 against the end 84 of the locking-pawl 42, Figs. 2 and 15, and forcing said pawl out of the path of the headed pins 39 40 on frame 38. The frame 38 thus unlocked can be partially turned to remove it in order to change the ballot or label having the names of the new candidates. This last movement of the rod 25 also rotates the spider 20 still farther, and the pins 27, Figs. 7, 11, and 17, working through slots 19, engage the upper extension 59 of the levers 56 and tilt the said levers from the position shown in full lines in Fig. 7 to the position shown in Fig. 11. The pawls 50 being thus forced out of engagement with the ratchets 48, the register-wheels are free to be reset to zero.

Independent Voting.

As so far described the voting-machine does not provide for casting a vote for a person not regularly nominated. Fig. 18 represents a special arrangement in which the cells are adapted to register the votes cast for five regular candidates and also to register the total number of independent votes cast in each cell and to operate mechanism to allow said independent votes to be cast. For instance, five of the central radial slots in which the key 1 may be tilted are labeled with the names of five regular candidates, respectively, while the sixth slot is labeled "Independent." When the key is tilted into the "Independent" slot, the corresponding register is actuated to record the number of independent votes cast in that cell and mechanism is operated to disclose a portion of paper on which the name of the independent candidate may be written. If all the keys 1 are tilted into the "Independent" slot in each and every cell, a narrow strip of the entire width of the record-sheet of paper would be disclosed ready to receive the names of independent candidates. As the key 1 is locked in whatever slot it enters, as before described, a voter is prevented from voting in the same cell both an independent and a regular vote.

Within the front part of the casing 100 is a table 101, over which travels a paper 102, Fig. 19, from a supply-roll 103, Figs. 18 and 19, on which a certain amount of paper is wound, to a receiving-roll 104. In the casing 100 is a narrow slot 105 directly over the table 101, wide enough to write with a pencil or otherwise record the name of an independent candidate. Swinging doors 106, Figs. 18 to 20, freely pivoted below the table 101 on shaft 107, normally close the slot 105, and thus cover the paper 102. The shaft 107 is mounted in end pieces 108 108, secured to the bottom of the casing 100. There is one independently-opening door 106 corresponding to every voting-cell, and each of said doors is separately and independently locked in the position to cover the corresponding writing-space by means of spring-actuated latch-rods 109, sliding in guides 110 in the casing and normally extending beneath lugs 111 on the doors 106. An upwardly-extending arm 112 of each latch-rod, guided in slot 113 in standard 6 of its corresponding cell, stands in the path traversed by the rider 11 on the key 1 when said key is tilted into the slot marked for the independent vote.

In voting for any of the regular candidates whose names appear on the label the registering is effected as described in reference to Figs. 1 to 17, but the mechanism for independent voting is not operated. When, however, the key 1 is tilted into the "Independent" slot, not only is its register actuated, but the rider 11 forces the latch-rod 109 112 back against the action of spring 114, and the door 106, corresponding to the cell operated, being unlocked, drops back by its own weight and uncovers a portion of the record-paper, upon which the voter can then write the name of his specially-selected candidate.

Loosely pivoted on one end of shaft 107 is an arm 115 and on the other end a pawl-carrier 116, Figs. 18, 19, and 20. A bar 117, mounted at one end in a lug on the arm 115 and at the other end in a lug on pawl-carrier 116, passes across the front of the machine just beneath the spurs 111 of the doors 106. The parts 115, 116, and 117 are normally maintained in the position shown in full lines in Figs. 19 and 20 by the counterbalance 118. At one end of the paper-supply roll 103, on a common center therewith, but independent therefrom, is a gear 119, with which pawl 120 on carrier 116 engages. Two arms 121, swinging on a center common with the roll 103, support a driving-roll 122, maintained in frictional contact with the paper-receiving roll 104 by spring 123 acting on pins 124, projecting from arms 121 through slots in frames 108. Fast at one end of the driving-roll 122 is a gear 125, meshing with gear-wheel 119.

When any one of the doors 106 drops back, the spur 111 falls upon bar 117, carrying the bar, the arm 115, and the pawl-carrier 116 downward, (see dotted position Fig. 20,) overcoming the counterweight 118, the said door, arm, and pawl-carrier all swinging on shaft 107. The pawl 120 drags back over the teeth of gear-wheel 119 and the arm 115 drops onto the cam or eccentric 126, rigidly secured to the inner end of controlling-shaft 71.

When the voter leaves the booth, the operating and indicating lever 72 is moved to reset the cells, as before described, and if any of the doors 106 have been operated the eccentric 126 on the end of the controlling-shaft 71 raises the arm 115 from the position shown in dotted lines in Fig. 20 to that shown in full lines or back to normal position. As the arm 115 is raised, bar 117 raises all of the doors 106 which may have been opened, and when the said doors have closed the slot 105 the latch-rods 109 of said opened doors spring forward, locking the doors in the closed position. The carrier 106 in returning actuates the gear 119 by means of the pawl 120 to unroll the paper from roll 103. The driving-roll, actuated by gears 119 and 125, winds the paper on the receiving-roll 104 by frictional contact. A fresh strip of the record-sheet is thus brought over the table 101. As the diameter of the roll of paper on the receiving-roll increases the driving-roll 122 is forced away against the action of spring 123. A belt 127 passes around two grooved pulleys, one fastened to gear 119 and the other engaging by means of a pin with receiving-roll 104. By the difference in size of these pulleys the belt 127 tends to rotate the receiving-roll slightly faster than the driving-roll 122 moves the paper to keep the paper under constant tension and tightly wound on the receiving-roll.

The rotation of the controlling-shaft 71 necessary to turn the eccentric 126 sufficiently to lift arm 115 is greater than the rotation required to reset the cells. Therefore a sleeve 128, carrying fingers 70 to engage the slides 69, is so mounted on shaft 71 that it partakes of part only of the rotation of said shaft. This is accomplished by providing the sleeve 128 with the slot 129, in which works a pin 130, projecting from shaft 71, said slot 129 being of a suitable length to permit the necessary extra rotation of shaft 71.

In reading the returns the number of votes cast for each regular candidate is shown on the corresponding register, as before described, and the total number of independent votes cast in each cell is shown by the register actuated by key 1 when tilted into the "Independent" slot. The votes for different independent candidates may be counted on the record-sheet 102.

The paper-supply roll 103 and arm 121 are pivoted on screws 131 and the receiving-roll 104 on pivot-screws 132, all screwed into frames 108. The screws when partly removed will permit the removal of the paper-rolls without disturbing the driving connections. To change the record-sheet 102, the front part 133 of the casing 100 is made to swing forward on pivots 134, Figs. 19, 21, and 22. Normally this swinging front 133 is locked by latches 135, Fig. 21, which latches are only withdrawn when the slide 69 is given the auxiliary motion necessary for "Reading returns" or "New election," hereinbefore described. This latch mechanism is shown in Figs. 18 and 22 in dotted lines and in full lines in Fig. 21. The slide 69 is provided with pins 136, adapted to strike bell-crank levers 137. Links 138 connect the bell-cranks to the latches 135, so that as the bell-cranks are turned the latches are withdrawn.

Fig. 23 represents a portion of the record-paper 102. The paper is divided in lengthwise columns, each of which may be marked, preferably, at short intervals with numerals, as "I I I" in the first column, "II II II" in the second column, &c. The number "I," "II," or "III," &c., in a column corresponds to a similar number on a cell at the independent slot and each column serves as a record-sheet of its correspondingly-numbered cell.

Group Voting.

When it is desired to have more than one vote cast in a single cell and then limit the number of votes cast in said cell or in a group of said cells, the arrangement shown in Figs. 24 to 27 is used. Such arrangement is necessary when a plurality of officers for like offices—such as judges, coroners, &c.—are to be elected at the same time and each political party nominates as many candidates as there are parallel offices to be filled. A voter may wish to divide his votes between candidates of different political parties. It is therefore necessary to allow the key 1 to be free to record more than one vote in a cell, and the keys of two or more cells are grouped by mechanism limiting the total number of times the keys in the aggregate may be operated.

The registering and resetting mechanisms in cells 200 to 203 are the same as described in reference to Figs. 1 to 17, except that the cup 16 on key 1 is dispensed with and in its place a spring-actuated sleeve 204 is provided, for a purpose hereinafter explained. This sleeve 204 does not interfere with consecutive operation of several of the registers, for when the crank 52 is turned down the hooked extensions 53, riding on the slightly-convex top of the sleeve, push it downward out of its way against the action of spring 205. (See cell 200, Fig. 25.) There being no cup 16 in which hook 53 can engage, the key 1 is not locked in its tilted position, but as soon as released by a voter after actuating a register returns to its normal upright position by means of spring-actuated rider 11. The crank 52 of the actuated register, however, being locked in its downward position by pawl 50 and ratchet 48, as before explained, the said register cannot be operated again until the resetting mechanism is actuated, thus preventing a voter from casting more than one vote for the same candidate.

To indicate and limit the total number of votes cast by one voter, the following totalizing mechanism is employed: Fitted in an opening in the base of the standard 6 is a plunger 206, normally pressed upward by spring 207 to abut against the lower end of rider 11. A platen 208, free to rotate in a circular recess in the base of the standard, is provided with guide-lugs 209 and 210, Figs. 24 and 25. The plunger 206 works through a central opening in the platen. A rack 211, guided by the lugs 209 and 210, passes through a slot in the plunger 206 without affecting its up-and-down motion. A pawl 212, carried by the plunger, is adapted to engage the rack 211 and drive it forward one tooth at each downward motion of the plunger. A spring 213, secured at one end to the rack and at the other end to a stationary bar 214, tends to return the rack when released by pawl 212, but is prevented from doing so by a retaining-pawl 215, pivoted to lugs 210 and engaging with the rack.

It will be evident that when the key 1 is tilted sufficiently to actuate a register the rider 11, by sliding down on the key 1, forces the plunger 206 downward, as shown in cell 200, Fig. 25, and the pawl 212 drives the rack 211 forward one tooth. When the key 1 is released and rider 11 resumes its normal position, spring 207 forces the plunger 206 up and the pawl 212 returns to the position shown in cell 201, Fig. 25, ready to engage the next tooth of the rack 211. Now if the rack 211 should be prevented from moving the plunger 206 would be stopped in its downward movement by pawl 212 engaging with the teeth in the said rack, and consequently rider 11 and key 1 could not be tilted sufficiently to actuate a register. To limit the number of votes, therefore, means are provided to stop the rack after it has been driven forward as many teeth as the number of votes to be cast by one voter.

As shown in Fig. 24, the racks 211 of the four cells are extended to one side of the machine and wedges 216 are pivoted to their outer ends. These wedges lie in one line and are guided in a slot formed on the block 217 by bar 214. Tenoned rollers or blocks 218 travel in the T-groove 219 in block 217 in front of the wedges 216. If all the rollers 218 were securely fastened to block 217 by the screws 220 in the positions shown in full lines in Fig. 24, each rack 211 would be able to travel the distance of one tooth only, as its wedge 216 would then come in contact with two adjacent rollers 218 and be stopped. In such cases the cells would virtually operate as the cell described in reference to Figs. 1 to 17—that is, one vote only could be cast in each cell; but if only the end rollers 218 are fastened by screws 220, as shown in Fig. 24, then one cell alone could be operated four times or until its wedge had pushed itself so far between two rollers that the rollers could move no farther. Such position is shown in dotted lines in Fig. 24. The other wedges would be turned on their pivots to assume approximately the positions shown in dotted lines and the racks of cells 200, 201, and 202 would be locked. It will be evident, moreover, that with the rollers or blocks secured as shown one cell might be operated twice and two other cells operated once, or two cells could be operated twice each, or one cell could be operated three times and another cell once. In every case only four votes could be cast. It will also be evident that if the end rollers 218 are secured to block 217 farther apart more than four votes could be cast by the four cells, or if any one of the central free rollers is fastened to block 217 the wedges on one side of said roller will not affect the rollers or wedges on the other side of said fastened roller, and therefore the cells may be formed into groups of two or more, as desired. For convenience of securing the rollers 218 in different but exact positions holes 221 are formed in block 217 to receive the screw 220.

The wedges are so calculated as to spread the rollers proportionately—that is, if one wedge is advanced two teeth or steps it would spread the rollers as much as if two wedges had been advanced one step each, &c. With the wedges proportioned as shown in the drawings they will require to be alternately beveled above and below at the larger ends to allow them to overlap when necessary.

Each complete tilting motion of the key 1 moves the rack one tooth, and could the said key be tilted into the same slot more than once, while it could not again operate the locked register, it would advance the rack, thereby reducing the number of votes. The spring-actuated sleeve 204 is therefore provided to prevent a second complete tilting motion of the key into the same slot. The said sleeve having returned to its raised position when the key is released after the first operation would strike the hook 53 locked in its downward position (see diagram Fig. 26) and prevent the key from moving in the same slot far enough to operate the rack.

When the voter leaves the booth and the indicating-lever 72 is moved to reset the registering mechanism for the next voter, as before described, a downwardly-extending arm 222 on the ring 24 comes in contact with an upward extension of pawl 215 and raises the pawl out of engagement with the rack 211. The spring 213 then forces the rack 211 back to its initial position. All the racks are returned in the same way, and while the rollers 218 may not resume the exact positions shown in Fig. 24 the forward point of each wedge is always between the rollers or blocks.

Fig. 27 shows a modification of the totalizer or means of limiting and predetermining the number of movements of the racks. The wedges 216 are dispensed with and the racks are pivoted to the alternate joints of a system of links 223, the other joints of said links being pivoted to loose rollers traveling in groove 224 of block 225. When the racks are in their normal positions, the links are partly drawn together, as shown in full lines in Fig. 27, and as the racks are advanced the links 223 spread, the extent of motion being limited by adjustable blocks 226. The dotted lines show the position the links would take if each rack had been advanced one tooth.

Amendment, Straight-Ticket, and Class Voting.

Fig. 28 is a plan of a voting-machine provided with cells 300 to 305 similar to the cell described in reference to Figs. 1 to 17 or partly of such cells and partly of cells adapted for group voting, in combination with a cell 306, adapted for voting for amendments, and another cell 307, adapted for straight-ticket voting. Figs. 28 to 30 also represent means for controlling the cells for class voting, as hereinafter explained.

*Amendments.*—As only two slots are necessary for the "Yes" and "No" vote for amendments, a single cell may be used for voting for more than one amendment. If, for instance, cell 306 is to be used to register votes for three amendments, the key 1 must be free to record more than one vote in a cell and means must be provided to prevent the voter from voting both "Yes" and "No" to the same amendment. The first requirement is fulfilled by constructing the key as described in reference to Figs. 24 to 26, and means for fulfilling the second requirement are shown in Figs. 31 to 34. Two adjacent registers are used for each amendment, and one register-shaft 44 of each pair of registers is provided with a pin 308. If key 1 is tilted into the slot corresponding to the register having said pin and the crank 52 is thus turned down, the pin 308 is moved directly into the path of the crank 52 of the adjacent register. (See Figs. 32 and 34.) The register-shaft 44, crank 52, and consequently the pin 308 of the first register being locked in this position by pawl 50 and ratchet 48, as before described, the crank 52 and shaft 44 of the adjacent or second register cannot be operated. On the other hand, if key 1 is first tilted into the slot corresponding to this second register and its crank 52 turned down to record a vote the said crank is locked in its downward position directly in the path of the pin 308 on the first register, (see Figs. 31 to 33,) whereby the first register becomes inoperative.

*Straight ticket.*—The mechanism in cell 307 for straight-ticket voting is the same as described in reference to Figs. 1 to 17, except that the lower end 309 of key 1 is extended below the rider 11 and engages with a locking-lever 310, pivoted at 311 to the standard 6, Fig. 29. This locking-lever 310 is provided with a slot 312, Fig. 28, out of line with any of the central radial slots in which key 1 moves, in which slot the end 309 of key 1 engages, whereby when key 1 is tilted its end 309 turns the locking-lever on its pivot 311, or if the locking-lever is prevented from moving key 1 cannot be tilted in any of the central radial slots of the cell. Projecting from the controlling-shaft 71 is a bolt-rod 313, adapted to enter a notch 314 in the locking-lever when the shaft 71 is in one of its three positions, hereinafter described in reference to Figs. 35 to 37, and the locking-lever is in its normal position, as shown.

Instead of the two movements of slide 69 from "voting" position to "locking" (and key-releasing) position and return, as so far described, the slides 69 in a machine adapted for straight-ticket and split-ticket voting have three movements.

Referring to diagrammatic views, Figs. 35 to 37, suppose the register at the left in each figure to stand for the register in a regular split-ticket cell 300 the central register in each figure for those of the amendment-cell 306 and the right-hand register in each figure for those of the straight-ticket cell 307. Fig. 35 represents the position of the slide 69 when the rings 24 of all the cells are in position to "lock" the register, (and release the keys,) as explained in reference to locking position in Figs. 1 to 17. Slide 69 would be moved toward the right from the position shown in Fig. 29. When the slides 69 are moved into the position shown in Fig. 36 and that represented in Figs. 28 to 30, the ring 24 of the split-ticket cell 300 is not moved, as the holes in slides 69, in which the downwardly-projecting pin 75 of ring 24 in cell 300 engages, is prolonged into a slot 315 to allow of this movement of slide 69 without affecting cell 300. The rings 24 of cells 306 and 307 have, however, been moved to voting position, and the registers in these cells may be operated. When the slides 69 are in this position, controlling-shaft 71 holds the bolt-rod 313 out of engagement with locking-lever 310, Fig. 29. When slide 69 is moved into the position shown in Fig. 37, (toward the left from position shown in Fig. 29,) ring 24 of cell 300 has moved to voting position, and the registers of cells 306 and 307 are also in voting position, not having been affected by the further movement of the rings 24. However, when the slides 69 are in this position the controlling-shaft 71 has rotated sufficiently to carry the bolt-rod 313 into notch 314 of locking-lever 310, whereby key 1 in straight-ticket cell 307 is prevented from being tilted, as explained.

Referring again to Figs. 28 to 30, when a voter enters the booth the mechanisms are set for straight-ticket voting, the slides being in position shown in Fig. 36. A handle 316, pivoted at 317, may be operated by the voter himself before voting to move the mechanism from straight-ticket position by means of projection 318 on the axis of the handle below the casing striking pin 319 on slide 69, thus moving the slide to position shown in Fig. 37. The amendment-cell in each case is free for voting. Supposing, however, the voter does not move handle 316 from the position shown, he may then vote a straight ticket; but in doing so the locking-lever 310 has been turned on its pivot 311 by the end 309 of key 1 and notch 314 has moved out of line with bolt-rod 313. (See dotted position of locking-lever, Fig. 28.) Key 1 being locked by cup 16 in its tilted position, locking-lever 310 is also locked, and a solid portion thereof being over the bolt-rod 318 this bolt-rod is prevented from rising. Therefore after a voter has voted in straight-ticket cell 307 he cannot move slide 69 by means of handle 316 for split-ticket voting, as shaft 71 is prevented by bolt-rod 313 from rotating in the direction to allow slide 69 to be moved by projection 318 and pin 319. On the other hand, if a voter before voting has turned the handle 316 to split-ticket position shaft 71 has been rotated to bring bolt-rod 313 into notch 314 of locking-lever 310, whereby the voter cannot vote in straight-ticket cell 307, and when he has once moved handle 316 to split-ticket position no movement of the handle will have any effect on slide 69.

*Class voting.*—When some of the voters at an election are restricted to vote in reference to certain offices or other matters—as, for instance, where women are allowed to vote for school trustees, &c., only—means are provided for locking some of the cells when such voters enter the booth.

Referring to Figs. 29 and 30, the keys 1 of all of the cells are extended below the rider 11 at 309, the same as in the straight-ticket cell, but for a different purpose. In a hub 320 in the base of standard 6 a bolt 321, hollowed out at its upper end to receive the lower extension 309 of key 1, is normally prevented from rising to engage the said key by a spring 322. Locking-slides 323 are guided in slots in a row of the said hubs 320, Figs. 29 and 30, and are operated by cog-wheels 324 on controlling-rod 325 engaging teeth 326 on said locking-slides. The upper side of the locking-slides are provided with recesses 327, carrying buttons 328, which when sprung into their raised position and placed under bolts 320 raise the said bolts against the action of springs 321 to engage the keys 1, as shown in cell 302, Fig. 29, thereby locking the said keys from action.

It will be evident that the different buttons 328 may be so arranged in their raised or lowered positions that when the pointer 329, fast on the end of controlling-rod 325 outside the booth, is set at a certain point for one class of voters all the keys may be free. If set at another point—say for a second class of voters—certain of the cells will be locked by bolts 320, or if set at another point—say for a third class of voters—certain other cells are locked, either in addition to or instead of those for the second class of voters.

While some or all of the cells 300 to 305 may be grouped together for group voting, a group such as represented in Fig. 24 may be placed alongside the cells shown in Fig. 28 and shaft 71 extended to actuate all the cells at once.

Figs. 38 to 41 show a modified construction of cell in which the nutating key 1 is in the form of a nutating disk-key 400. The spherical portion 401 of this disk-key oscillates in socket-bearing 402 on a central pillar 403, rising from standard 404. In the center of the key is a recess 405, the bottom of the recess being approximately on a level with the center of the ball-bearing. A headed piston 406 passes through a central opening in the spherical part 401 and is guided in the pillar 403, the head 407 resting on the shoulder formed in the disk-key by recess 405. A helical spring 408, surrounding the piston in a recess in the pillar, is held in tension by the sleeve 409 and nut 410. The head 407, bearing on the disk-key under pressure of spring 408, holds the disk in a horizontal position. The sleeve 409 is fitted on the piston and serves to guide it in the recess of the pillar 403. The top of the bearing 402 is sufficiently far below the under side of the disk-key surrounding the spherical part to allow the disk-key to be tilted about eight degrees from its normal horizontal position. When the disk-key is tilted, the piston not being free to tilt with it is raised against the action of spring 408, and when the disk-key is released spring 408 forces the piston and key back to normal position. A hood 411, surrounding the disk-key, has a vertical slot 412, in which a pin 413 on the disk-key travels. This pin prevents the key from rotating, but does not interfere with the tilting of the disk-key.

The registers 414, instead of being supported by the stationary register-plate, as described in reference to Figs. 1 to 17, are secured to the under side of the disk-key 400. The register-shafts 415 (corresponding to shafts 44 of Figs. 1 to 17) are provided with crank-arms 416 at their outer ends. Posts 417, rising from the upper face of the standard 404, stand directly in the paths the crank-arms 416 would travel if the registers were moved downward. Therefore when the disk-key is depressed the crank-arm 416 of the register then at the lowest point strikes its corresponding post 417 (see full lines in Fig. 40) and the crank-arm and its shaft are turned about one-tenth of a revolution, (see dotted lines in Fig. 40), thereby registering a unit, as described in reference to Figs. 1 to 17.

In order to properly effect the registering, it is necessary that the disk-key be tilted in certain definite pressure lines, and to prevent the cell from being actuated more than once at the same time means to lock the disk-key after one operation are necessary. These two requirements are fulfilled by the following mechanism: In the center of the base of the standard 404 is a hub 418, in which is a spring-actuated plunger 419. A pin 420, traveling in a slot 421 in the hub, prevents the plunger from rotating. The piston carries a guide and locking-head 422, in the upper face of which are guide-grooves 423, corresponding in number and radial direction to the registers on the disk-key— in this case six. A curved arm 424, extending downward from the disk-key, carries at its lower end a guide-pin 425, engaging in the guide-grooves 423. It will be evident, therefore, that the disk-key 400 can only be depressed or tilted in certain directions, defined by the guide-grooves 423, in which guide-pin 425 may travel. The bottoms of the grooves 423 are on two different planes, the outer portion of each groove being deeper than the inner portion. Normally the spring 426 of the plunger 419 is compressed by the guide-pin 425 bearing on the raised central portion of the guide-grooves. When the disk-key is depressed, the guide-pin travels outward, and as soon as it passes beyond this raised central portion of the grooves the plunger rises under the influence of the spring 426, thus preventing the return of the guide-pin, which strikes the upright wall between the two planes of the groove. The disk-key is therefore locked in this inclined position and a register cannot be again operated until the key is released. To release the key, the piston 419 is drawn downward against the action of spring 426 and the arm 424 and disk-key are returned to normal position by spring 408.

We claim as our invention—

1. In a registering apparatus, a key free to be tilted in various directions, and means for locking the key when tilted in any one direction.

2. In a registering apparatus, a key free to be tilted in various directions, and means for independently recording any of said tiltings, and preventing further operation of the said key after it has been tilted, until it is reset.

3. A multiple tilting key free to rotate on its own axis, two registers independently actuated thereby, the operation of either of said registers being dependent upon the tilting of the key in a predetermined direction but independent of its rotation.

4. In a registering apparatus, a radially-movable multiple key, two or more registers actuated thereby, and means for preventing more than one register from being operated at a time.

5. In a registering apparatus, a radially-movable key, a series of registers independently operated thereby, the path of action of said key being in a different radial direction for each register.

6. In a registering apparatus, a multiple tilting key, a plurality of registers independently actuated thereby, the path of action of said key for the operation of each of said registers being predetermined.

7. In a registering apparatus, a tilting key, two or more registers independently operated thereby, the advance of any of the said registers being constant and equal for each operation of the key.

8. In a registering apparatus, a multiple pivoted key, a series of registers actuated thereby, and means for limiting the motion of the key in as many paths radial to its pivoting-point as there are registers in the series.

9. A multiple tilting key, a register operated thereby, and means for preventing two consecutive operations of the said register, without resetting the key.

10. A multiple tilting key, two or more registers operated thereby, and means for preventing two consecutive operations of any of said registers, without resetting the key.

11. In a registering apparatus, a multiple tilting key, and means for preventing two consecutive tiltings of said key, without resetting the machine.

12. In a registering apparatus, a multiple tilting key, a register actuated thereby, and positive means for preventing further action of said key when said register has advanced one unit, until the key is reset.

13. In a registering apparatus, a multiple tilting key, a register actuated thereby, and means for locking said key by the said register-actuator, when the register has advanced one unit.

14. In a registering apparatus, a multiple tilting key, registers actuated by said key, a resetting mechanism therefor, and means for preventing two consecutive operations of the same register, without resetting the machine.

15. A multiple tilting key, and a resetting device for said key, said resetting device participating in the tilting of said key.

16. A tilting key, a resetting device for said key, the angular position between the axis of the key and the bearing-face of said resetting device being the same in all tilted positions of the key.

17. A pivoted multiple key, and a resetting device placed below the pivot center of said key.

18. A nutating key and a spring-actuated resetting device therefor, mounted on said key.

19. A tilting key and a resetting device tilting therewith, and free to slide on the said key when tilted.

20. A multiple key, a spring-actuated resetting device therefor, said device and its spring being mounted directly on the said key.

21. A multiple key free to be tilted in various directions, and means to retain said key in tilted position, until reset.

22. A multiple key free to be tilted in various directions, a resetting-spring for said key, means for holding said key out of normal position against the action of said spring when the key is tilted, and means for releasing said key to allow said spring to return the key to its normal position.

23. A multiple key free to be tilted in various directions, and positive means to lock said key in tilted position.

24. A multiple key free to be tilted to a predetermined extent and in various directions, and means to reduce or limit the extent of tilting of said key in one or more directions, while the extent of tilting remains constant in other directions.

25. In a registering apparatus, a multiple key, two or more registers adapted to be independently actuated thereby, and means for resetting the said key in a normal position, said normal position being constant and independent of the register actuated.

26. In a voting-machine, a cell having a series of registers therein, a multiple tilting key adapted to actuate said registers, locking means for said registers, an indicator outside the cell, and connected to the said locking means, whereby the key can actuate the registers only when the indicator is set at the proper, predetermined position.

27. In a voting-machine, a group of tilting keys, a plurality of series of registers, each register of a series adapted to be operated by one of said keys, and means to vary and limit the total number of times the keys in said group may be operated in the aggregate.

28. In a voting-machine, a group of tilting multiple keys dependent upon each other, a series of registers adapted to be operated by the said keys, and means to prevent any of the said registers from being actuated twice in succession.

29. In a voting-machine, a group of tilting keys, a plurality of series of registers, each register of a series adapted to be actuated by one of the said keys, and a totalizer to limit the aggregate number of motions of said keys.

30. In a voting-machine, a group of multiple keys, capable of being tilted in various definite directions, means for limiting the aggregate number of motions of said keys, and to independently record the number of motions of each of the keys in the various definite directions.

31. In a voting-machine, a group of tilting keys, a series of registers, all the registers of a series adapted to be operated by one of the said keys, a totalizer to limit the aggregate number of operations of the keys, and means to prevent any key from actuating a single register twice.

32. In a voting-machine, a tilting key, two registers adapted to be operated thereby, and interlocking means between the said registers, to allow the operation of only one of either of the said two registers.

33. In a voting-machine, a mutiple key free to be tilted in various directions, a plurality of series of two registers each, adapted to be actuated by said key, and means for preventing the operation of one of the said registers after the other of the same series has been operated.

34. In a voting-machine, a series of voting-cells each provided with a key free to be tilted in various directions, a series of registers in each cell adapted to be actuated by a key, and means to prevent the operation of certain predetermined keys.

35. In a voting-machine, a key free to be tilted in various directions, a series of registers actuated thereby, a paper normally covered, and means for exposing a portion of said paper when said key is tilted in a predetermined direction.

36. In a voting-machine, a key free to be tilted in various directions, a paper normally covered, means for exposing a portion of said paper when said key is tilted in a predetermined direction, and means for recording the tiltings of said key in said predetermined direction.

37. In a voting-machine, a plurality of keys free to be tilted in various directions, a paper normally covered, and means to expose a portion of said paper when any one or more of said keys are moved in a predetermined direction.

38. In a voting-machine, a key free to be tilted in various directions, a paper normally covered, means to expose a portion of said paper when the key is tilted in a predetermined direction, and of recording the tilting of said key in said predetermined direction, with means for re-covering the paper after it has been exposed.

In testimony whereof we have signed our names to this specification in the presence of two subscribing witnesses.

FRANK LAMBERT.
SAUL ARONSON.

Witnesses:
MAUD F. KELSEY,
CHAS. A. PEARD.